United States Patent
Reynoso Gomez et al.

(10) Patent No.: US 10,030,132 B2
(45) Date of Patent: Jul. 24, 2018

(54) ETHYLENE COPOLYMER-MODIFIED PLASTISOL

(71) Applicant: E I DU PONT DE NEMOURS AND COMPANY, Wilmington, DE (US)

(72) Inventors: Sara Luisa Reynoso Gomez, Mexico City (MX); Elizabeth R. Griffin, Newark, DE (US)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 168 days.

(21) Appl. No.: 15/179,078

(22) Filed: Jun. 10, 2016

(65) Prior Publication Data

US 2016/0362578 A1  Dec. 15, 2016

Related U.S. Application Data

(60) Provisional application No. 62/174,562, filed on Jun. 12, 2015, provisional application No. 62/220,287, filed on Sep. 18, 2015.

(51) Int. Cl.
| | |
|---|---|
| *C08L 27/06* | (2006.01) |
| *C09D 127/06* | (2006.01) |
| *C08L 33/14* | (2006.01) |
| *C08L 23/08* | (2006.01) |

(52) U.S. Cl.
CPC .............. *C08L 27/06* (2013.01); *C08L 33/14* (2013.01); *C09D 127/06* (2013.01); *C08L 23/0869* (2013.01)

(58) Field of Classification Search
CPC ........ C08L 27/06; C08L 33/14; C09D 127/06
See application file for complete search history.

(56) References Cited

U.S. PATENT DOCUMENTS

| | | | |
|---|---|---|---|
| 2,632,921 | A | 3/1953 | Kreidl |
| 2,648,097 | A | 8/1953 | Kritchever |
| 2,683,894 | A | 7/1954 | Kritchever |
| 2,714,382 | A | 3/1955 | Kreidl |
| 2,897,183 | A | 7/1959 | Christl et al. |
| 3,404,134 | A | 10/1968 | Rees |
| 3,780,140 | A | 12/1973 | Hammer |
| 3,960,984 | A | 6/1976 | Kohan |
| 4,098,843 | A | 7/1978 | Johnson |
| 4,497,941 | A | 2/1985 | Aliani et al. |
| 4,732,814 | A | 3/1988 | Hatada et al. |
| 4,766,168 | A | 8/1988 | West |
| 4,814,397 | A | 3/1989 | Novak |
| 5,011,890 | A | 4/1991 | Novak |
| 5,028,674 | A | 7/1991 | Hatch et al. |
| 5,063,263 | A | 11/1991 | Hayes et al. |
| 5,447,789 | A * | 9/1995 | Griffin .................... B32B 27/30 428/308.4 |
| 5,618,881 | A | 4/1997 | Hojbr |
| 6,147,170 | A | 11/2000 | Hofmann |
| 6,500,888 | B2 | 12/2002 | Baumgartner et al. |
| 6,518,365 | B1 | 2/2003 | Powell et al. |
| 7,737,210 | B2 | 6/2010 | Feinberg |

FOREIGN PATENT DOCUMENTS

EP  0587727 B1  11/1992

\* cited by examiner

*Primary Examiner* — Edward J Cain

(57) ABSTRACT

Provided herein is a plastisol composition comprising a halogenated polymer and an ethylene carbon monoxide copolymer that is dispersed or dissolved in a liquid plasticizer. A process for producing the plastisol composition is further provided.

19 Claims, No Drawings

ETHYLENE COPOLYMER-MODIFIED PLASTISOL

CROSS-REFERENCES TO RELATED APPLICATIONS

The present application claims priority under 35 U.S.C. § 119 to U.S. Provisional Application Nos. 62/174,562, filed on Jun. 12, 2015, and 62/220,287, filed on Sep. 18, 2015, each of which is incorporated herein by reference in its entirety.

FIELD OF THE INVENTION

This invention relates to a plastisol composition comprising a halogenated polymer and an ethylene copolymer dispersion or solution in a liquid plasticizer and a process for producing the composition.

BACKGROUND OF THE INVENTION

Several patents and publications are cited in this description in order to more fully describe the state of the art to which this invention pertains. The entire disclosure of each of these patents and publications is incorporated by reference herein.

Polyvinyl chloride (PVC) without modification is very brittle, and thus it is typically made more flexible by plasticization with low or high molecular weight plasticizers. A wide variety of materials have been used as plasticizers, generally liquids of viscosities such that they are usually characterized as oils or syrups. The first plasticizers to be used for this purpose were either low molecular weight liquid monomeric organic phthalates or phosphate esters or low molecular weight oligomeric polyesters, which are in effect syrupy liquids. Even materials designated as "polymeric" that have molecular weights of a few thousand or below are very viscous liquids at 25° C.

An important component of polyvinyl chloride plastisols is a liquid plasticizer of low molecular weight that causes the PVC resin to flow and the end product to be flexible. Plastisols are suspensions of small PVC particles in liquid plasticizer. They are made by mixing the PVC particles and the plasticizers in a mixer until well-blended. Plastisols flow as a liquid or paste and can be poured or spread into a heated mold. Above the Tg for the composition, the small PVC particles begin to absorb the plasticizer molecules. Further heating to about 160 to 170° C. or higher causes the mixture to fuse, forming an entangled molecular network. On cooling the mold below 60° C., a flexible, permanently plasticized solid product results. Aside from molding, plastisols are commonly used to prepare geomembrane or architectural canvas, as a textile ink for screen printing and as a coating, for example a dip-coating, particularly in outdoor structures (roofs, furniture), among other applications.

Disadvantageously, conventional liquid plasticizers have low molecular weights such that after a certain period of time they may migrate to the surface of the PVC or a product made from the PVC. Eventually, the liquid plasticizers can evaporate, or be washed away, leaving a stiff, brittle, or fragile PVC product.

Therefore, there is a need to produce a modified plasticizer that will not evaporate or migrate out of a plastisol or a product made from the plastisol. Alternatively, the modified plasticizer can reduce or substantially reduce the evaporation or migration of the plasticizer.

Some high molecular weight materials have been used to plasticize PVC. For example, U.S. Pat. No. 3,780,140 describes plasticizers consisting of copolymers of ethylene, carbon monoxide and a third monomer that can be a vinyl ester or an acrylate or methacrylate for use in plastics such as polyvinyl chloride (PVC), nitrocellulose, etc.

At about the same time, it was also recognized that ethylene vinyl acetate copolymers with high vinyl acetate contents were effective polymeric plasticizers for polyvinyl chloride. Both ethylene vinyl acetate copolymers and the copolymers described in U.S. Pat. No. 3,780,140 are used today to plasticize nonporous polyvinyl chloride.

The ethylene copolymers are routinely used in flexible PVC formulations for use in melt-processable rubbers, flexible PVC sheeting, pond liners, membranes, wire coatings, cable jackets, injection molded parts, and other profile-extruded articles.

Polyvinyl chloride containing both conventional low molecular weight plasticizers and high molecular weight plasticizers is described in U.S. Pat. No. 3,780,140. Incorporating the high and low molecular weight plasticizers with the polyvinyl chloride is accomplished by blending a solution of polyvinyl chloride in tetrahydrofuran with a solution of the high and low molecular weight plasticizers in tetrahydrofuran, followed by evaporating the tetrahydrofuran.

U.S. Pat. No. 6,147,170 describes novel plasticizer compositions that comprise ethylene copolymers combined with reactive ultraviolet (UV) absorbing agents. Copolymers of ethylene/carbon monoxide/termonomer were grafted with dicarboxylic acid anhydride groups such as maleic anhydride, reacted with polymerizable UV stabilizers, and used as plasticizers for polymers such as PVC.

U.S. Pat. No. 7,737,210 describes a composition comprising or produced from polyvinyl chloride, filler, and an impact strength-retaining amount of a modifier wherein the modifier may be an ethylene copolymer including copolymers of ethylene/carbon monoxide/termonomer, an acid anhydride- or acid monoester-modified polyolefin, or combinations thereof.

European Patent No. EP0587727 describes a process for preparing a free-flowing plasticized powdered PVC composition. The process comprises blending a combination of a solid high molecular weight ethylene copolymer plasticizer and a low molecular weight liquid plasticizer with porous polyvinyl chloride powder having substantially no impermeable skin at temperatures from 70 to 130 ° C. until a free flowing powdered plasticized polyvinyl chloride is obtained.

Nevertheless, there remains a need for PVC compositions that are easily processed, that have improved stability with respect to aging and UV attack, or that have improved mechanical properties such as resistance to punctures and tears.

SUMMARY OF THE INVENTION

Accordingly, provided herein is a free-flowing plasticized halogenated polymer plastisol composition ("plastisol") comprising a combination of plasticizers, a nonporous halogenated polymer powder having substantially impermeable skin and a porosity less than 0.1 ml/g, and optionally other additives. The plastisol comprises about 15 to about 75 weight % of the combination of plasticizers, based on the total weight of the free-flowing plasticized halogenated polymer plastisol composition. Complementarily, the free-flowing plasticized halogenated polymer plastisol composition comprises about 25 to about 85 wt % of the nonporous halogenated polymer powder. In turn, the combination of plasticizers comprises 1 to 99 weight %, based on the total weight of the combination of plasticizers, of a high molecular weight solid ethylene copolymer plasticizer for halogenated polymer that is miscible with the halogenated polymer. The halogenated polymer has a melt index at 190° C. not greater than about 3000 g/10 minutes. The ethylene copolymer plasticizer comprises a) an ethylene terpolymer of the general formula E/X/CO wherein E represents copolymerized units of ethylene, X represents copolymerized units of a vinyl ester or a (meth)acrylic ester, and CO represents copolymerized units of carbon monoxide; or b) an ethylene terpolymer of the general formula E/X/CO as in (a) that is anhydride-modified, for example E/X/CO/grafted MA, which may be obtained by grafting reaction between the preformed E/X/CO copolymer and maleic acid or maleic anhydride; or combination of (a) and (b). Complementarily, the combination of plasticizers also comprises 1 to 99 weight %, based on the total weight of the combination of plasticizers, of a low molecular weight (LMW) liquid plasticizer for halogenated polymer. The liquid plasticizer has a molecular weight not greater than about 3000 daltons, and the solid ethylene-containing copolymer plasticizer is soluble in the liquid plasticizer.

Also provided is a process for the preparation of a free-flowing plasticized halogenated polymer plastisol composition comprising mixing about 15 to about 75 weight %, based on the total weight of the plasticized halogenated polymer plastisol composition, of a combination of plasticizers with a complementary amount of a nonporous halogenated polymer powder having substantially impermeable skin and a porosity less than 0.1 ml/g and optionally other additives, so that the temperature of the composition during mixing is no greater than 60° C.; and blending until the halogenated polymer powder is suspended in the combination of plasticizers and the free-flowing plasticized halogenated polymer plastisol is obtained; wherein the combination of plasticizers comprises
(i) 1 to 99 weight %, based on the total weight of the combination of plasticizers, of a high molecular weight solid ethylene-containing copolymer plasticizer for halogenated polymer, said halogen polymer having a melt index at 190° C. not greater than about 3000 g/10 minutes, and said high molecular weight solid ethylene-containing copolymer plasticizer being miscible with the halogenated polymer; and complementarily
(ii) 99 to 1 weight %, based on the total weight of the combination of plasticizers, of a low molecular weight liquid plasticizer having a molecular weight not greater than about 3000 daltons, and in which the solid ethylene-containing copolymer plasticizer is soluble.

Notably, the ethylene-containing copolymer plasticizer comprises, consists essentially of, or consists of (a) an ethylene terpolymer of the general formula E/X/CO wherein E represents copolymerized units of ethylene, X represents copolymerized units of a vinyl acetate or a (meth)acrylic ester, and CO represents copolymerized units of carbon monoxide; (b) an ethylene carbon monoxide-functional copolymer that is anhydride-modified in the form of E/X/CO/grafted MA, e.g., obtained by grafting reaction between the preformed E/X/CO copolymer with maleic acid or maleic anhydride; or (c) a combination of (a) and (b).

The process may comprise combining an ethylene carbon monoxide copolymer solid plasticizer (E/X/CO) as described above with a liquid plasticizer to produce a plasticizer solution of the solid plasticizer in the liquid plasticizer; and combining a halogenated polymer such as PVC with the plasticizer solution to produce an ethylene carbon monoxide copolymer-modified plastisol.

The process may also comprise combining a liquid plasticizer with a halogenated polymer such as PVC to produce a first plastisol, which is mixed with the E/X/CO solution to produce an E/X/CO-modified plastisol.

Further provided herein is an article comprising the plastisol composition described above.

Still further provided herein is a method to form a coating comprising the plastisol described above on a substrate comprising (1) providing a blend composition comprising the plastisol; (2) providing a substrate; (3) coating blend composition comprising the plastisol onto the substrate; and (4) heating the coated substrate to fuse the plastisol.

DETAILED DESCRIPTION OF THE INVENTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the terms "a" and "an" include the concepts of at least one" and "one or more than one". The word(s) following the verb "is" can be a definition of the subject.

The term "consisting essentially of" in relation to compositions is to indicate that substantially (greater than 95 weight % or greater than 99 weight %) the only polymer(s) present in a composition is the polymer(s) recited. Thus this term does not exclude the presence of additives, e.g. conventional additives. Moreover, such additives may possibly be added via a masterbatch that may include other polymers as carriers, so that minor amounts (less than 5 or less than 1 weight %) of polymers other than those recited may be present. Any such minor amounts of these materials do not change the basic and novel characteristics of the composition including adhesion to rubber and air permeation prevention.

When the term "about" is used in describing a value or an end-point of a range, the disclosure should be understood to include the specific value or end-point referred to.

Unless stated otherwise, all percentages, parts, ratios, etc., are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the end-points thereof, and all integers and fractions within the range. It is not intended that the scope of the invention be limited to the specific values recited when defining a range. When a component is indicated as present in a range starting from 0, such component is an optional component (i.e., it may or may not be present). When present an optional component may be at least 0.1 weight % of the composition or copolymer.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that may have become recognized in the art as suitable for a similar purpose.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such. Polymers having more than two types of monomers, such as terpolymers, are also included within the term "copolymer" as used herein. A dipolymer consists of two copolymerized comonomers and a terpolymer consists of three copolymerized cornonomers.

"(Meth)acrylate" includes methacrylate and/or acrylate. Alkyl (meth)acrylate refers to alkyl acrylate and/or alkyl methacrylate.

Viscosity is a measure of the resistance of a fluid to being deformed by either shear or tensile stress. In everyday terms for fluids only, viscosity may be thought of as "thickness" or "internal friction". For example, water is "thin", having a lower viscosity, while honey is "thick", having a higher viscosity. The less viscous a fluid is, the greater its ease of movement (fluidity). As used herein, viscosity refers to dynamic or absolute viscosity. For comparison, the viscosity at 25° C. of water is 0.894 centipoise and the viscosity of chocolate syrup may range from about 10,000 to about 25,000 centipoise, depending on its composition and water content.

Surprisingly, it has now been discovered that a liquid plasticizer for use with halogenated polymers such as polyvinyl chloride (PVC) can be modified with an ethylene carbon monoxide terpolymer (E/X/CO copolymer), especially an E/X/CO copolymer having relatively high molecular weight, to produce a modified plasticizer. When used with PVC to make the PVC flexible, the modified plasticizer can reduce, substantially reduce, or substantially prevent a plasticizer in the modified plasticizer from migration out of PVC made therefrom. PVC plastisol made with the E/X/CO modified plasticizer may have other improved properties, such as chemical resistance, mechanical properties, and resistance to aging, compared to other products that do not contain the E/X/CO modified plasticizer.

An E/X/CO resin is generally or normally supplied in pellet (solid) form. Solid pellets can be blended with PVC resin using melt compounding techniques developed for combining resins with unmatched melt viscosities. Nevertheless, the use of pellets has previously caused difficulties in PVC production because E/X/CO copolymers used in the prior art melt at low temperature, forming a lower viscosity liquid, while the PVC is mostly amorphous and requires shear to properly blend. The viscosity mismatch disrupts the shear, making it more difficult to blend the polymers uniformly.

Plastisols, however, must be handled at room temperature or no higher than 60° C. prior to fusion. Therefore, the use of solid PVC pellets to form a plastisol is impractical. Advantageously, however, the E/X/CO-modified plasticizer described herein enables the production of a PVC plastisol product that benefits from an optimal combination of high molecular and low weight plasticizers. In particular, the E/X/CO-modified PVC plastisol can be prepared by dissolving the E/X/CO in a liquid plasticizer to produce an E/X/CO-modified plasticizer, which in turn is blended at a temperature below 60° C. with another PVC plastisol. The other PVC plastisol may be unmodified, or it may be modified with a different high or low molecular weight plasticizer. Alternatively, the E/X/CO-modified plasticizer may be mixed with diffusion PVC particles at a temperature below 60° C. to form the the E/X/CO-modified PVC plastisol directly.

The halogenated polymers, plasticizers and E/X/CO copolymers are described in greater detail below.

Suitable halogenated polymers include vinyl halide polymers, including polymers wherein at least 80 weight % of the polymer comprises vinyl halide, such as polyvinyl chloride; copolymers of vinyl chloride with olefins such as ethylene or polyethylene, vinyl acetate or vinyl ethers; vinylidene halide polymers such as polvinylidene fluoride or copolymers of vinylidene chloride and vinyl chloride. Preferred is polyvinyl chloride. For convenience, the descriptions below may refer only to polyvinyl chloride or PVC; it is to be understood, however, that these descriptions encompass other halogenated polymers defined herein as suitable.

The terms "polyvinyl chloride" and "PVC", as used herein, refer to neat polyvinyl chloride polymer, to copolymers of vinyl chloride with other comonomers, or to compositions comprising polyvinyl chloride polymer and at least one additional material. Since commercial polyvinyl chloride resin typically contains processing aids, plasticizers, stabilizers, and possibly other additives, the amount of polyvinyl chloride in commercial polyvinyl chloride resin is always less than 100%.

Different forms of polyvinyl chloride are used in different applications. One important property is the mean molecular weight (Mw) of the polymer. Porosity of the PVC particles is a function of Mw and of the surfactant used during the polymerization. Dispersion PVC, with low porosity, is used for plastisols, and is usually prepared by micro-suspension or emulsion polymerization that produces nonporous particles less than 1 μm in size.

Intrinsic viscosity is the solution viscosity of a polymer that is extrapolated to zero concentration of polymer. Intrinsic viscosity is a standard method for characterizing the molecular weight of polymers such as polyvinyl chloride. A factor known as the K value is used to indicate the mean molecular weight of polyvinyl chloride. The K value is a unitless empirical parameter closely related to intrinsic viscosity, often defined in slightly different ways in different industries to express a viscosity-based estimate of statistical molecular mass of polymeric material. The most commonly used K value in Europe is the Fikentscher K value (referenced in DIN EN ISO 1628-1), which is obtained by a combination of measuring dilute solution viscometry and solving the Fikentscher equation. The K value is also the subject of German standard DIN 53726. Typically, higher K values are correlated with better mechanical properties and with lower flowability or higher viscosity.

In preferred embodiments, the PVC resin has a Fikentscher K value of from about 50 to about 70, and even more preferably from about 55 to about 70.

The terms "plastisol" and "flexible PVC" are known to those of skill in the art and are used herein to refer to a suspension or blend of PVC particles with liquid plasticizer. In the case of plastisols, a "dispersion" resin with small particle size and low porosity, such as a nonporous powder having substantially impermeable skin and a porosity of less than 0.1 ml/g, allows the PVC particle to be suspended in plasticizer. As discussed above, the preparation of plastisols requires low-temperature processing below about 60° C. When blended at or near room temperature, PVC and plasticizer can form a homogeneous mixture of PVC particles well dispersed or suspended in the liquid plasticizer, which can flow as a viscous liquid.

In contrast, a flexible PVC dry blend composition comprises a non-fused mixture of PVC, plasticizer and other ingredients in powder form. A high-porosity PVC is used and higher mixing temperatures are used so that the liquid plasticizer is absorbed into the pores of the particles. This provides a granular material to feed to melt blenders such as extruders, Banbury mixers, Farrel Continuous mixers (FCM), Buss Ko-Kneaders, etc. Generally, a dry blend PVC composition comprises about 10 to 70%, 30 to about 70, or about 40 to about 60% by weight of the plasticizer, based on the total weight of the blend of PVC, plasticizer, and other ingredients.

A general reference about the preparation of plastisol and flexible PVC dry blends is "PVC Handbook"; C. E. Wilkes, J. W. Summers and C. A. Daniels, eds; Hanser Gardner Publications, Cinncinnati.

A low molecular weight liquid plasticizer is an additive that increases the plasticity or fluidity of a material. The major applications are for plastics, especially PVC, such as phthalate esters for improving the flexibility and durability of PVC.

The low molecular weight liquid plasticizers in which the high molecular weight plasticizers are dissolved are well-known plasticizers for polyvinyl chloride. The low molecular weight plasticizers that can be monomeric or polymeric have a molecular weight not greater than 3500, usually from 1000 to 3000 daltons. The amount of low molecular weight plasticizer added to the polyvinyl chloride is generally from 5 to 50 weight percent, preferably 10 to 30 weight percent, based on the total weight of the E/X/CO plasticizer polymer. Representative low molecular weight liquid plasticizers that can be used in the present process that are conventionally used to plasticize polyvinyl chloride include phthalates, adipates, azealates, trimellitates, phosphate esters and polyesters. The phthalate esters are most commonly used. The adipates and azelates impart improved low temperature properties to the polymers. Trimellitates can provide improved high temperature performance and may be used in medical applications. The phosphates render the polymers flame retardant. Higher alkyl phthalates, e.g., diundecyl phthalate, improve fogging resistance of the polymer when used, for example, as dashboard covers in automobiles. Representative specific low molecular weight liquid plasticizers that can be used in the process described herein include dioctyl phthalate, diundecyl phthalate, dibutyl adipate, dibenzylazelate, trioctyltrimellitate, diphenyl octylphosphate and low molecular weight polyesters and polypropylene glycol. These low molecular weight plasticizers for polyvinyl chloride are well-known in the art and they are described in Modern Plastics Encyclopedia, Vol. 57, page 222, 1980-1981.

Examples of liquid plasticizers are carboxylate esters including, but not limited to, any dicarboxylic or tricarboxylic ester-based plasticizers, such as phthalate esters, including phthalate diesters such as bis(2-ethylhexyl) phthalate (DEHP), di-octyl phthalate (DOP), diisononyl phthalate (DINP), diisodecyl phthalate (DIDP). Branched phthalates, linear phthalates and trimellitates include those available commercially from BASF under the Palatinol® tradename. Liquid plasticizers also include acetic acid esters of monoglycerides made from castor oil; or other nonphthalate plasticizers for PVC including trimellitates such as tris(2-ethylhexyl) trimellitate, adipates such as bis(2-ethylhexyl) adipate, benzoates such as 1,5-pentanediol dibenzoate, adipic acid polyesters, polyetheresters, epoxy esters or maleates. Adipate plasticizers include those available commercially from BASF under the Plastomoll® tradename. Other nonphthalate liquid plasticizers include those available commercially from BASF under the Hexamoll® DINCH® tradename, especially for use in food contact or medical applications. "Polymeric" plasticizers for low migration include those available commercially from BASF under the Palamoll® tradename.

The solid plasticizers used are miscible with the halogenated polymer, such as polyvinyl chloride, and they are soluble in the low molecular weight plasticizer. Notably the solid plasticizer is an ethylene carbon monoxide terpolymer (E/X/CO), which may optionally include copolymerized residues of additional monomers.

The E/X/CO terpolymer can comprise copolymerized units derived from ethylene and alkyl (meth)acrylate or vinyl acetate and up to 35 weight % of copolymerized units of carbon monoxide, based on the total weight of the E/X/CO terpolymer. Ethylene terpolymers of the general formula "E/X/CO" are plasticizer polymers functionalized with carbon monoxide, which enables a small amount of acetate, acrylate, or acrylic acid comonomer to be used. Examples of ethylene carbon monoxide terpolymer or E/X/CO plasticizers include: a) ethylene terpolymers of the general formula E/X/CO where E represents copolymerized residues of ethylene, X represents copolymerized residues of a "softening" monomer such as, for example, vinyl acetate or a (meth)acrylic ester, and CO represents copolymerized residues of carbon monoxide; and b) ethylene carbon monoxide-functional copolymer that is anhydride-modified in the form of E/X/CO/grafted MA, e.g., obtained by grafting reaction between the preformed E/X/CO copolymer with maleic acid or maleic anhydride.

Suitable ethylene carbon monoxide terpolymers include an ethylene alkyl (meth)acrylate carbon monoxide terpolymer, an ethylene vinyl acetate carbon monoxide terpolymer, and combinations thereof. A (meth)acrylate can be an alkyl acrylate or an alkyl methacrylate. The alkyl group can contain 1 to 8, or 1 to 4, carbon atoms. Examples of suitable alkyl groups include methyl, ethyl, propyl, butyl, and combinations of two or more thereof. In general terms, the ethylene provides strength, the (meth)acrylate or vinyl acetate provides softness, and the carbon monoxide provides additional polarity. Generally for these copolymers, the proportion of copolymerized ethylene will be about 40 to 80 weight percent, the proportion of copolymerized (meth) acrylate or vinyl acetate will be about 5 to 60 weight percent, and the proportion of copolymerized carbon monoxide will be about 3 to 35 weight percent, to total 100 weight percent of the E/X/CO copolymer. Preferably, the amount of copolymerized vinyl acetate or (meth)acrylate will be about 5 to 50 weight % or about 10 to 35 weight %, and the amount of copolymerized carbon monoxide may be about 3 to 30 weight % or about 3 to 10 weight %, or from 3 to 20 weight %, the remainder of the E/X/CO copolymer being copolymerized ethylene.

Ethylene alkyl (meth)acrylate carbon monoxide copolymers can be produced by processes well known in the art using either autoclave or tubular reactors. See e.g., U.S. Pat. Nos. 5,028,674; 2,897,183; 3,404,134; 5,028,674; 6,500,888 and 6,518,365. Processes for manufacturing ethylene carbon monoxide terpolymers are also described in U.S. Pat. Nos. 3,780,140 and 4,497,941.

Preferred ethylene alkyl (meth)acrylate carbon monoxide copolymers are ethylene n-butyl acrylate carbon monoxide (EnBACO). An EnBACO terpolymer containing about 10 weight % carbon monoxide, 30 weight % n-butyl-acrylate, and ethylene constituting the balance can be prepared according to the general process and in the equipment described in U.S. Pat. No. 3,780,140. EnBACO terpolymer resins are also commercially available under the trademark Elvaloy® from E. I. du Pont de Nemours and Company, Wilmington, Del. (DuPont). These polymers may have an average molecular weight of about 250,000-400,000 daltons. They are non-migrating and have good chemical resistance. A mixture of two or more different ethylene alkyl (meth)acrylate carbon monoxide copolymers can also be used.

Ethylene/vinyl acetate/carbon monoxide (EVACO) is another suitable polymer. The relative amount of vinyl acetate comonomer incorporated into EVACO can be from 0.1 weight % up to as high as 40 weight percent of the total copolymer or even higher. Preferably, the amount of copolymerized vinyl acetate will be about 5 to 50 weight % or about 10 to 35 weight %, and the amount of copolymerized carbon monoxide may be about 3 to 30 weight % or about 3 to 10 weight % of the copolymer, the remainder of the weight of the EVACO being copolymerized ethylene.

Alternatively, the E/X/CO may be grafted with maleic anhydride or another graft comonomer. That is, the ethylene carbon monoxide-functional copolymer in the form of being anhydride-modified, e.g., "E/X/CO/grafted MA", contains carboxylic acid anhydride groups pendant from the polymer backbone. The monomer may be selected from the group consisting of ethylenically unsaturated carboxylic acids and ethylenically unsaturated carboxylic acid anhydrides, derivatives of such acids and ethylenically unsaturated hydrocarbons with other functional groups. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride, e.g. dimethylmaleic anhydride. Examples of the derivatives of the unsaturated acids are salts, amides, imides and esters e.g. mono- and disodium maleate, acrylamide, maleimide and diethyl fumarate. Examples of ethylenically unsaturated hydrocarbons with other functional groups are vinyl pyridines, vinyl silanes and unsaturated alcohols, e.g. 4-vinyl pyridine, vinyltriethoxysilane and allyl alcohol. Anhydride modification preferably is obtained by grafting reaction between the preformed copolymer with maleic acid or maleic anhydride monomers to form succinic anhydride groups on the copolymer by conventional procedures. Typically, the amount of anhydride modification, that is, the amount of grafted comonomer, will be about 0.1 to 5 weight percent based on the weight of the grafted copolymer. Techniques for the grafting of such monomers are known, e.g., as described in U.S. Pat. No. 5,618,881.

Suitable high molecular weight solid ethylene copolymer plasticizers have a melt index at 190° C. not greater than about 3000 g/10 minutes according to ASTM D1238-65T condition E, usually 1 to 3000 g/10 minutes, preferably 5 to 300 g/10 minutes. The E/X/CO polymers, including grafted polymers, may have melt indices of about 5 to about 200 g/10 minutes or from a lower limit of about 8, 12, 25 or 35 to an upper limit of about 100 g/10 minutes. Desirably, the melting point of the E/X/CO polymer is below the Tg of the PVC used in the composition.

The plastisol can be produced by any methods known to one skilled in the art, but it is preferably produced by the processes disclosed herein.

The process may comprise combining an E/X/CO copolymer with a liquid plasticizer to produce an E/X/CO solution; combining the E/X/CO solution with a halogenated polymer such as PVC to produce an E/X/CO modified plastisol mixture wherein each of the E/X/CO copo, plasticizer, and plastisol can be as disclosed above.

The E/X/CO modified plasticizer may contain from a lower limit of about 1, about 2, about 3, about 5 or about 10 weight % to an upper limit of about 7, about 10, about 20 25, about 40, or about 50, or about 99 weight % of E/X/CO polymer, based on the total weight of the E/X/CO-modified plasticizer, so long as the E/X/CO can be dissolved or substantially dissolved in the liquid plasticizer to produce an E/X/CO-modified plasticizer. The low molecular weight liquid plasticizer makes up the remainder of the E/X/CO-modified plasticizer to a total of 100 wt %.

For example, the weight ratio of high molecular weight solid plasticizer to low molecular weight liquid plasticizer may be from 1:99 to 2.5:1, preferably from 1:20 to 1:1, or from 1:5 to 1:1.5. The desirable percentage of E/X/CO in liquid plasticizer will be determined by the final viscosity needed to blend the plastisol.

An E/X/CO copolymer can be combined with, or added to, a liquid plasticizer by any means known to one skilled in the art to produce a solution or substantially a solution. To facilitate the formation of a solution, the combination or addition can be mixed by, for example, mechanical means such as stirring. For example, the formation of an E/X/CO solution in a liquid plasticizer can be carried out under atmospheric conditions, stirring for 10 to 30 minutes at 65° C. to 150° C. and 700 to 800 RPM.

Desirably, the E/X/CO solution remains liquid so that It may be as well incorporated in the plastisol blend as would be an unmodified liquid plasticizer.

Depending on the viscosity of the liquid plasticizer, a final Brookfield viscosity between 800 to 1500 cPoises at a room temperature of around 23° C. (73° F.) using spindle #2 at 100 RPM allows the E/X/CO solution to flow as a liquid or viscous liquid that can be fed to the plastisol blend similarly to an unmodified liquid plasticizer. This allows for the E/X/CO solution to be well-incorporated into the plastisol blend.

Higher percentages of E/X/CO copolymer in the E/X/CO solution may result in an E/X/CO solution that does not flow at room temperature. With high-percentage E/X/CO solutions, the plastisol blending operation may need to be modified to accommodate essentially solid E/X/CO solutions, for example by slight heating up to about 50° C., or by extended blending, or by both heating and blending. Preferably, the high-percentage E/X/CO solution is warmed to no higher than 60° C. prior to adding it to the PVC to provide sufficient flow to allow for easy mixing.

In an embodiment of the process, the halogenated polymer such as PVC may be combined with a liquid plasticizer (and optionally other ingredients as described below) to produce a first plastisol; an E/X/CO-modified plasticizer solution of E/X/CO copolymer and liquid plasticizer is prepared; and the first plastisol is mixed with the E/X/CO-modified plasticizer to provide an E/X/CO-modified plastisol.

The E/X/CO-modified plastisol may contain about 10 to about 80 weight %, or about 30 to about 50 weight %, of PVC, based on the total weight of the E/X/CO-modified plastisol. Complementarily, the E/X/CO-modified plastisol may contain about 20 to about 90 wt %, or about 50 to about 80 wt %, of the E/X/CO-modified plasticizer, based on the total weight of the E/X/CO-modified plastisol.

In an alternative process, the E/X/CO-modified plastisol or the E/X/CO-modified plasticizer can be combined with, or added to, a plastisol comprising PVC and plasticizer in such a rate that the E/X/CO remains completely dissolved, or substantially dissolved, in the plastisol to produce a different E/X/CO-modified PVC plastisol.

The plastisol blends can include, in addition to PVC, liquid plasticizer and the ethylene copolymer, in amounts of about 0.001 to about 25 weight %, based on the total weight of the plastisol blend, other additives, modifiers, and ingredients as are generally used in the polymer art, including stabilizers and co-stabilizers (such as those disclosed in U.S. Pat. Nos. 3,960,984; 4,098,843; 4,766,168; 4,814,397; 5,011,890; and 5,063,263), antioxidants, dyes, pigments or other coloring agents, ultraviolet (UV) absorbers, UV stabilizers, thermal stabilizers, nucleating agents, anti-static agents, fire-retardants, smoke suppressors, fusion aids, process aids, glass, mineral fillers such as calcium carbonates, lubricants, epoxidized soy oil (ESO), fungicides, adhesion promoters such as isocyanates, or combinations of two or more thereof.

Since polyvinyl chloride is thermally sensitive, stabilizers are preferably added to the polymer. A large variety of stabilizers are customized for polyvinyl chloride, including inorganic and organometallic compounds, such as lead, barium-cadmium, and cadmium-zinc. Nitrogenous and epoxy compounds are well known stabilizers. Such stabilizers include a barium-zinc soap stabilizer, epoxidized soybean oil and inorganic salts. Other thermal stabilizers are described in U.S. Pat. No. 5,011,890, such as polyacrylamide. Usually, these stabilizers are present in amounts from about 5 to 10 weight percent based on the total weight of polyvinyl chloride in the plastisol.

Antioxidants are added to ethylene copolymers because of their sensitivity to air oxidation. Suitable antioxidants include selected phenolic types and secondary antioxidants, such as thioethers and phosphites. Representative antioxidants include dilauryl thiodipropionate, ditridecyl thiodipropionate, tris(nonylphenyl)phosphite, butylated hydroxy toluene, and tetrakis methylene (3,5-di-tert-butyl-4-hydroxyhydro-cinnamate) methane. Usually these antioxidants are present in amounts of 300 to 1600 ppm for the phenolics, and in amounts of 300 to 10,000 ppm for the thioethers and phosphites, based on the total amount of ethylene copolymer(s) in the plastisol.

Benzotriazole-type UV stabilizers can be used as UV absorbers. This type of UV stabilizer is commercially available from BASF Corp. under the tradename Tinuvin®.

E/X/CO-modified plastisols can be applied by spread coating, knife coating, roll coating, molding, dipping, spraying and the like. The most widely used application method is coating. After a transformation process such as extrusion, calendaring, spreading/heating, etc., a flexible, permanently plasticized solid can be produced.

Molding may be used for producing hollow articles such as balls, dolls, and toys. The process may use an E/X/CO-modified plastisol with low viscosity at low shear rate that has a short gelation time and is easy to deaerate. In rotational molding, the plastisol is poured into a cold mold that rotates around two perpendicular axes while entering an oven where it is heated with air to 200 to 250° C. After gelation and fusion, the mold is cooled in a waterbath.

An E/X/CO-modified plastisol as described herein may be used for slush molding. Slush molding is an inexpensive process which enables flowable materials to be molded in an open hollow mold, without pressure or shear. Open hollow shapes are produced by this technique with lightweight inexpensive molds. Slush molding may be carried out using the plastisol composition by spreading the free-flowing plastisol inside a chase on a metal plate, covering the polyvinyl chloride plastisol filled cavity with another plate and placing the assembly into a compression molding apparatus at about 225° C. The platens of the press are closed to touch, but do not exert any pressure on the mold/plastisol assembly. The sample may be heated for about three to five minutes depending on the thickness (about 40 mil) of the sample.

An E/X/CO-modified plastisol as described herein may be used for slush casting, a form of spin casting that is more complex than relatively simple resin casting, but less expensive and less sophisticated than injection molding used for most plastic products. It involves metal molds that are filled with liquid plastisol. When the open mold cavities are filled, the mold is spun on a heavy duty, high speed centrifuge to force the liquid composition into all of the fine detail on the interior of the mold. Then the metal mold is placed into a heating solution, usually an industrial salt heated to about 200° C. (400° F.). The liquid vinyl is heated for a few seconds; then, the mold is then removed from the heating solution and the remaining liquid is poured out. This leaves a thin skin of vinyl on the interior of the metal mold. The mold is then placed back into the heating solution for three to four minutes to cure or fuse the thin skin of vinyl. After curing, the mold is again removed from the heating solution, cooled with water, and placed on a rack. The articles may be annealed for a period of time, for example at 60° C. in an air circulating oven for 20 minutes to 24 hours. While the vinyl part is still warm in the mold, it is very flexible and can be removed from the mold with pliers. When the parts cool, they become rigid and are ready for assembly.

The E/X/CO-modified PVC plastisol composition may also be injection-molded, compression molded or overmolded onto a substrate to provide a shaped article comprising the composition.

E/X/CO-modified PVC plastisols may be used to prepare articles by applying the plastisol to a substrate such as polymeric sheets, textiles, or shaped objects by various coating methods.

Methods to form a coating comprising the E/X/CO-modified plastisol on a substrate comprise or consist essentially of (1) providing a blend composition comprising or consisting essentially of the E/X/CO-modified plastisol described above; (2) providing a substrate described below;

(3) coating the E/X/CO-modified plastisol onto the substrate; and (4) heating the coated substrate to fuse the plastisol.

The substrate may be any material providing support, shape, esthetic effect, protection, surface texture, bulk volume, weight, or combinations of two or more thereof to enhance the functionality and ease of handling the structure. Essentially any substrate material known in the art may be used.

Any support or substrate meeting these desired characteristics may be used with the E/X/CO-modified plastisol. Cellulosic materials such as paper webs (for example Kraft or rice paper), materials made from synthetic fiber spun fabrics, nonwoven textiles, films, open-cell foams, closed-cell foams, microporous films, or even perforated films having large percentages of open areas such as perforated PE films, may be used as materials for the substrate(s), for example. Metallic foils such as aluminum foil may also be used as substrates.

Cellulosic materials include paper, paperboard, cardboard, and pulp-molded shapes. Paper, paperboard, cardboard and the like refer to physical forms derived from cellulose or its derivatives that have been processed as a pulp and formed by heat and/or pressure into sheets. Paper describes thin sheets made from cellulose pulp that are somewhat flexible or semi-rigid. In general, paperboard and cardboard are thicker, rigid sheets or structures based on paper. Typically, paperboard is defined as paper with a basis weight above 224 g/m$^2$. In accordance with the present disclosure, the paper layer or paperboard layer used in the substrate may have a thickness of 30 to 600 µm and a basis weight of 25 to 500 g/m$^2$, or 100 to 300 g/m$^2$. Cardboard can be a monolithic sheet or can have a more complex structure, such as corrugation. Corrugated cardboard comprises a sheet of corrugated paper adhesively sandwiched between two flat sheets of paper. A coating of the E/X/CO-modified plastisol may be useful as an adhesive for producing the corrugated cardboard. Pulp-molded shapes are typically nonplanar shapes in which the cellulosic pulp is molded into a rigid shape by application of pressure and/or heat. An example of a pulp-molded shape is an egg carton.

In some embodiments, the substrate may be a material comprising a release agent that does not adhere to PVC. The substrate, such as release paper, can be coated with the plastisol and after the plastisol is cured can be removed, resulting in a plasticized PVC film. In other embodiments, the plastisol may be applied between a release paper and a substrate to which it adheres. After curing the release paper can be removed to provide a plasticized PVC-coated substrate.

Example substrates also include a textile or porous sheet material. A textile may also include nonwoven textiles prepared from polypropylene, polyethylene, polyesters such as polyethylene terephthalate or mixtures thereof, and other spun bonded polymer fabrics. Sheets made from synthetic fiber spun fabrics, such as nonwoven textiles, may be used as a textile substrate. Cloth that is woven, knitted or the like is also suitable as a textile substrate. Natural fibers alone or in combination with man-made fibers can also be used in textile substrates. A fabric may comprise flame retardant(s), filler(s), or additive(s) such as those described above.

The substrate material may be in the form of a film, sheet, woven fabric, nonwoven fabric and the like. The substrate material may be unoriented or oriented, such monoaxially or biaxially oriented. The substrate material may comprise a polymeric or a metal composition. The substrate may be treated to enhance, for example, adhesion with the coating.

The treatment may take any form known in the art such as for example, adhesive, primer or coupling agent treatments or surface treatments, such as chlorine treatments, flame treatments (see, e.g., U.S. Pat. Nos. 2,632,921; 2,648,097; 2,683,894; and 2,704,382), plasma treatments (see e.g., U.S. Pat. No. 4,732,814), electron beam treatments, oxidation treatments, chemical treatments, chromic acid treatments, hot air treatments, ozone treatments, ultraviolet light treatments, sand blast treatments, solvent treatments or corona treatments and combinations of the above.

Specific examples of suitable substrate materials include poly(ethylene terephthalate) (PET) films, biaxially-oriented poly(propylene) (BOPP) films, polyimide films, aluminum foil, paper, paperboard, and the like. Preferably, the substrate material is paper, paperboard and the like to allow for repulpability after use.

The substrate material may have any thickness, but generally ranges from about 0.1 to about 20 mils thick, such as from about 0.5 to about 10 mils thick.

The E/X/CO-modified plastisol can be applied to the substrate in any suitable manner known in the art, including gravure coating, roll coating, wire wound rod coating, dip coating, flexographic printing, spray coating and the like. Excess plastisol can be removed by squeeze rolls, doctor knives and the like, if desired.

For paper and paperboard substrates, the plastisol may be applied to the preformed paper or paperboard substrate, as described above, or during the manufacture of the paper or paperboard substrates using, for example, size presses, such as a puddle size press, a metering size press, a vertical size press, an inclined size press and a horizontal size press, roll coaters, gate-roll coaters, blade coaters, bill blade coaters, and sprayers to coat the plastisol onto the paper or paperboard substrate. The plastisol can be applied to one or both sides of the substrate.

E/X/CO-modified plastisol can be used to coat paper, fabrics, metals, felt, and glass fibers to produce wallpapers, floor coverings, vinyl leather, conveyor belts, and tarpaulins and similar coated sheet articles. Each application needs its own formulation, in which the appropriate resin grade and plasticizer must be used to give the required rheological characteristics. In the case of fabric coating where direct spreading is employed, it may be desirable to avoid penetration of the plastisol into the fabric. Therefore, the viscosity behavior of the paste for such embodiments may be strongly pseudoplastic at low shear rate and have moderate viscosity at high shear rate. In wallpapers, where thin coatings are applied, a low viscosity resin with Newtonian behavior is desirable. In production of flooring, three or four or even more coatings may be applied, including an impregnation layer to saturate the fibers, one or two foam coats, and a wear layer with high mechanical strength. Each coat needs different grade resin to achieve the required properties. Normally, each layer is gelled at 150° C. before application of the next layer. When the last coat is applied the entire coating is fused in an oven at 200° C. The foam layer can be chemically or mechanically foamed. Usually mechanical embossing is used to create surface textures and apply colored patterns.

Shaped articles may be coated with the E/X/CO-modified plastisol by for example, dip coating, spray coating, overmolding, compression molding or other similar processes known in the art.

After coating the substrate, the E/X/CO-modified plastisol is fused by heating to greater than 60° C., such as from 100 to 200 ° C. to provide a solid coating of the E/X/CO-modified composition on the substrate.

Such coated sheets can be used for packaging, roofing, membranes, drapes, or flooring.

Articles comprising the E/X/CO-modified plastisol described herein, including substrates coated with the E/X/CO-modified plastisol, include artificial leather, shoes, boots and the like, projection screens, coated fabrics or textiles (including woven or knitted textiles or nonwoven fabrics) for clothing, decorative fabrics, protective equipment, billboards, banners, tarpaulins, tents, conveyor belts, construction fabrics including building encapsulation sheets, pool liners, roofing membranes or roofing fabrics, waterproofing membranes, geotextiles, wall coverings, flooring, architectural canvas or textiles, automotive interior parts including dashboards, door panels, handles, grips, and the like, hollow items including toys such as balls, dolls, etc., traffic signs, window clings and any other article which has previously comprised plastisols that were not E/X/CO-modified as described herein.

A notable shaped article is a glove, such as household or surgical gloves. Gloves can be prepared by forming the E/X/CO-modified plastisol into a glove shape, followed by heat curing. Finger cots, which are shaped to cover one's fingers and/or thumbs without covering the remainder of the hand, may be prepared similarly. The glove can be formed over a glove-shaped metal or ceramic mold by dipping the mold into the fluid E/X/CO-modified plastisol, followed by heat fusing and removal from the glove form. In some embodiments, the formed glove may be further treated such as with powder or flocking to provide a flocked or powdered surface on the glove. It may be useful to apply the flocking or powder to the outside of the shaped glove while on the glove form, followed by removal of the glove from the form by turning it inside out, thereby providing a glove wherein the flocked or powdered surface is the inside surface that will contact one's hand. Alternatively, gloves and/or finger cots may be prepared by coating the E/X/CO-modified plastisol onto at least a portion of a glove-shaped or finger-shaped substrate, such as a substrate comprising a textile, including a knitted or woven textile. The E/X/CO-modified plastisol may be applied to essentially the entire outer surface of the substrate, such as by dip coating, to provide a fully coated glove. Alternatively, the E/X/CO-modified plastisol may be applied to select portions of the glove such as the fingertips and/or palm area to provide a gripping surface while allowing the remaining uncoated portion of the glove to provide breathability. The E/X/CO-modified plastisol may also be applied to the glove substrate in a pattern such as dots, stripes or the like. Applying the E/X/CO-modified plastisol to the glove substrate may be accomplished by dipping, gravure coating, roll coating, wire wound rod coating, flexographic printing, spray coating and the like. Such E/X/CO-modified plastisol gloves are useful for providing protection to the user's hands, to provide improved gripping for handling objects, or to protect objects being handled from contamination from the user's hands. Some gloves are useful for antistatic purposes. For example, antistatic gloves, also known as conductive gloves, may be made of dust-free nylon fabric knitted with nylon and carbon filament yarns coated with the E/X/CO-modified plastisol on the palm and fingers. The E/X/CO-modified plastisol for antistatic purposes may further comprise antistatic additives known in the art.

Other shaped articles comprising the E/X/CO-modified plastisol include handles, knobs, tools and the like, wherein the E/X/CO-modified plastisol may provide a decorative appearance and/or an improved gripping surface. The E/X/CO-modified plastisol can be molded into the desired shape as described above. Alternatively, the E/X/CO-modified plastisol may be applied to a shaped substrate by overmolding, dip coating, spray coating or the like.

The following examples are provided to describe the invention in further detail. These examples, which set forth specific embodiments and a preferred mode presently contemplated for carrying out the invention, are intended to illustrate and not to limit the invention.

EXAMPLES

Equipment

A blender was equipped with a bowl having 20-cm diameter and two liter volume, and with a stirrer comprising a motor and a propeller of three blades, each 5 cm long, and having a rotational speed of about 300 to 400 rpm for blending. The propeller was placed as close to the bottom of the bowl as possible to provide thorough mixing.

Other equipment includes a Brookfield viscometer, stainless steel bowl (20 cm diameter and 2 liter volume), a conventional heater for heating the bowl, an oven to preheat a plasticizer, thermometers, small glass bottles (250 ml) with caps for handling samples, scales, foil, cleaning tissue, and spatulas.

Materials

E/X/CO copolymers used included:

EnBACO-1: ethylene n-butyl acrylate carbon monoxide terpolymer comprising 63 weight % of copolymerized units of ethylene, 27 weight % of copolymerized units of butyl acrylate, and 10 weight % of copolymerized units of CO, with melt index of 100 g/10 min.

EnBACO-2: a terpolymer comprising 60 weight % of copolymerized units of ethylene, 30 weight % of copolymerized units of n-butyl acrylate and 10 weight % of copolymerized units of carbon monoxide, with melt index of 12 g/10 min.

EnBACO-3: a terpolymer comprising 60 weight % of copolymerized units of ethylene, 30 weight % of copolymerized units of n-butyl acrylate and 10 weight % of copolymerized units of carbon monoxide, with melt index of 25 g/10 min.

EnBACO-4: a terpolymer comprising 60 weight % of copolymerized units of ethylene, 30 weight % of copolymerized units of n-butyl acrylate and 10 weight % of copolymerized units of carbon monoxide, with melt index of 8 g/10 min.

EnBACO-5: a terpolymer comprising 57 weight % of copolymerized units of ethylene, 30 weight % of copolymerized units of n-butyl acrylate and 13 weight % of copolymerized units of carbon monoxide, with melt index of 12 g/10 min.

EVACO-1: ethylene vinyl acetate carbon monoxide terpolymer comprising 62.5 weight % of copolymerized units of ethylene, 28.5 weight % of copolymerized units of vinyl acetate, and 9 weight % of copolymerized units of CO, with MI of 35 g/10 min.

EVACO-2: a terpolymer comprising 71.5 weight % of copolymerized units of ethylene, 20.5 weight % of copolymerized units of vinyl acetate and 8 weight % of copolymerized units of carbon monoxide, with melt index of 15 g/10 min.

EVACO-3: ethylene vinyl acetate carbon monoxide terpolymer comprising 68 weight % of copolymerized units of ethylene, 24 weight % of copolymerized units of vinyl acetate, and 8 weight % of copolymerized units of CO, with MI of 35 g/10 min.

Liquid plasticizers used included:

DOP: dioctyl phthalate, commercial grade available from BASF, Mexichem, or Exxon.

DIDP: diisodecyl phthalate, commercial grade available from BASF, Mexichem, or Exxon.

DINP: diisononyl phthalate commercial grade available from BASF, Mexichem, or Exxon.

AAM: acetic acid ester of monoglycerides, commercially available from Danisco under the Grindsted™ Soft-and-Safe tradename.

Dissolving E/X/CO Copolymer in Liquid Plasticizer

Method A: a pre-heated (80° C. or 176° F.) liquid plasticizer was added to a bowl containing E/X/CO pellets, allowing the pellets to soften prior to blending, followed by mixing in the blender for 30 minutes at 350 to 370 rpm. While blending, the temperature of the plasticizer mixture increased up to 100 to 110° C. (212 to 230° F.).

Method B: a preheated plasticizer (120° C. or 248° F.) was added to a bowl containing E/X/CO pellets, allowing the pellets to soften, immediately followed by mixing in the blender for 15 minutes at 350 to 370 rpm using the preheated plasticizer at 120° C. (248° F.).

Method C: a preheated plasticizer (150° C. or 302° F.) was added to a bowl containing ECO pellets, allowing the pellets to soften, and immediately followed by mixing in the blender for 8 to 10 minutes at 350 to 370 rpm using the preheated plasticizer at 150° C. (302° F.).

The blending time was measured once the temperature of the plasticizer mixture reached 100° C. for Method A; 120° C. for Method B; or 150° C. for Method C.

When adding E/X/CO pellets to preheated plasticizer, the ECO pellets took longer to soften, as compared to adding the preheated plasticizer to the E/X/CO pellets. Therefore, it was desirable to start blending immediately to avoid the pellets sticking to the bottom of the blender bowl. Method B and Method C allowed for better dispersion and more uniform viscosity values.

Using Method B or C, various concentrations of EnBACO-1 or EVACO-1 in DINP or DIDP were prepared as summarized in Table 1. Viscosity measurements at different concentrations and temperatures were made using a Brookfield viscometer according to ASTM D1824, "Standard Test Method for Apparent Viscosity of Plastisols and Organosols at Low Shear Rates". The results are summarized in Tables 1, 2 and 3.

TABLE 1

| Example | ECO | Weight % | Liquid Plasticizer | Weight % | Blending Method | Viscosity at 25-30° C. (cP) |
| --- | --- | --- | --- | --- | --- | --- |
| C1 | None | 0 | DINP | 100 | B | 103 |
| 1 | EnBACO-1 | 10 | DINP | 90 | A | 2,200 |
| 2 | EnBACO-1 | 10 | DINP | 90 | B | 733 |
| 3 | EnBACO-1 | 15 | DINP | 85 | A | 15,300 |
| 4 | EnBACO-1 | 15 | DINP | 85 | B | 10,200 |
| 5 | EnBACO-1 | 20 | DINP | 80 | B | 32,200 |
| 6 | EnBACO-1 | 25 | DINP | 75 | B | 120,000 |
| 7 | EnBACO-3 | 10 | DINP | 90 | A | 2,200 |
| 8 | EnBACO-3 | 10 | DINP | 90 | B | 2,133 |
| 9 | EnBACO-3 | 15 | DINP | 85 | A | 25,200 |
| 10 | EVACO-1 | 5 | DINP | 95 | B | 644 |
| 11 | EVACO-1 | 6 | DINP | 94 | B | 918 |
| 12 | EVACO-1 | 6.5 | DINP | 93.5 | B | 930 |
| 13 | EVACO-1 | 7 | DINP | 93 | B | 980 |
| 14 | EVACO-1 | 8 | DINP | 92 | B | 2620 |
| 15 | EVACO-1 | 10 | DIDP | 90 | A | 4,133 |
| 16 | EVACO-1 | 10 | DINP | 90 | A | 1,733 |
| 17 | EVACO-1 | 10 | DIDP | 90 | B | 3,600 |
| 18 | EVACO-1 | 10 | DINP | 90 | B | 1,400 |
| 19 | EVACO-1 | 10 | DINP | 90 | B | 6670 |
| 20 | EVACO-1 | 10 | DINP | 90 | C | 1,066 |
| 21 | EVACO-1 | 15 | DINP | 85 | A | 5,866 |
| 22 | EVACO-1 | 15 | DINP | 85 | B | 6,333 |
| 23 | EVACO-1 | 20 | DINP | 80 | B | 19,860 |
| 24 | EVACO-1 | 25 | DINP | 75 | B | 62,260 |
| 25 | EVACO-1 | 25 | SNS | 75 | B | 28,460 |

Viscosity tests summarized in Table 2 showed that up to 7 wt % of EVACO-1 in DINP flowed like oil at 25° C., similar to the original DINP. Above 7 wt % the blends behaved more like a gel and needed heating to be flowable.

TABLE 2

| | Example | | | | | |
| --- | --- | --- | --- | --- | --- | --- |
| | C1 | 10 | 11 | 12 | 13 | 14 | 19 |
| wt % EVACO-1 in DINP | 0 | 5 | 6 | 6.5 | 7.0 | 8.0 | 10 |
| Brookfield Viscosity (cPoise) | 103 | 644 | 918 | 930 | 980 | 2620 | 6670 |

At 35° C. (95° F.), the 10 to 15 weight % E/X/CO-modified plasticizers were clear and slightly yellow in color and had a viscosity similar to honey. At room temperature, the modified plasticizers were slightly cloudy. Table 3 summarizes the viscosity of the Example solutions at various elevated temperatures.

TABLE 3

| | Brookfield Viscosity (cPoise) at the temperature (° C.) indicated | | | | | | |
|---|---|---|---|---|---|---|---|
| Example | 75 | 70 | 60 | 50 | 40 | 35 | 30 |
| 1 | | 400 | | | | 1,133 | |
| 2 | | 133 | | | 533 | 667 | |
| 3 | | 867 | | | 3,333 | 4,800 | |
| 4 | 400 | 600 | 1,000 | 1,533 | 1,733 | 3,066 | 10,200 |
| 5 | 1,133 | | 2,266 | | 5,133 | 15,730 | 32,200 |
| 6 | 3,133 | 3,200 | 5,066 | 9,133 | 14,460 | 61,530 | >120,000 |
| 7 | 400 | | | | | 1,133 | |
| 8 | | 267 | | | 1,066 | | |
| 9 | 867 | | 933 | | 5,800 | | |
| 15 | 266 | | | | | 1,466 | 4,133 |
| 16 | 267 | | | | | 1,022 | |
| 17 | 133 | | 333 | | | 1,200 | 1,466 |
| 18 | 200 | | | | 1,200 | | 1,400 |
| 20 | 133 | | | | 933 | | 1,066 |
| 22 | 600 | | 1,533 | 2,466 | 2,800 | 4,466 | 6,333 |
| 23 | | 1,533 | 3,333 | 6,666 | 8,533 | 12,530 | 19,860 |
| 24 | | 6,266 | 9,133 | 12,060 | 20,930 | 30,930 | 62,260 |
| 25 | 3,800 | 4,133 | 6,133 | 12,200 | 20,800 | 28,460 | |

In all cases below 40° C. (104° F.), dispersions with EVACO-1 showed lower viscosity than those with EnBACO-1. Viscosity values were lower with Method B, especially for EnBACO-1 dispersions. When solutions with DIDP cooled to 25° C. (77° F.), the viscosity increased significantly. At high concentrations, 20 to 25% of EnBACO-1, significant viscosity increase started below 40° C. (104° F.).

Blending with PVC or PVC Plastisol

Method D: using low percentage of E/X/CO in plasticizer, the resulting solution behaved similarly to the liquid plasticizer without added E/X/CO and could be added to the plastisol from the beginning at room temperature.

Method E: using high percentage of E/X/CO in plasticizer, the resulting blend behaved like a gel, but it could be heated up to 60° C. (140° F.) to achieve suitable flow performance and then added to the rest of the plastisol.

The E/X/CO was dissolved in plasticizer and then added to PVC powder (Iztavil P-440 commercially available from Mexichem) along with additional ingredients using either method D or E. Example 18 shows an example of blending the E/X/CO-modified plasticizer with a "dry" PVC blend, without liquid plasticizer, suitable for preparing a plastisol. Example 19 shows an example of blending the E/X/CO-modified plasticizer with a PVC plastisol blend, with added liquid plasticizer.

Example 26

An EVACO solution containing 7% by weight of EVACO-1 in DINP was added to the rest of the ingredients (PVC (150-250 phr), calcium carbonate (10-40 phr), thermal stabilizer (2-6 phr), UV absorber (0.2-1 phr), pigment (40-90 phr), flame retardant (10-15 phr), anti-oxidant (0.2-1 phr), and no additional plasticizer) and blended using Method D. The resulting E/X/CO-modified plastisol blend was spread on a polyester fabric and covered with release paper, followed by fusing in an oven at 180° C. (356° F.) for 1.2 minutes. After being cooled to room temperature (about 26° C. or 79° F.), the PVC-coated fabric that was formed over the paper was separated from the paper.

Example 27

An EVACO solution with 40% of EVACO in DINP was heated to 60° C. (140° F.). The heated solution was then added to a plastisol blend with 40 phr of DINP that was at room temperature in a blender followed by blending at 350 rpm. The resulting E/X/CO-modified plastisol blend was spread on a polyester fabric and covered with release paper, followed by fusing in an oven at 180° C. (356° F.) for 1.2 minutes. After being cooled to room temperature, the coated fabric was separated from the paper.

Examples 26 and 27 provided good fabric coated sheets.

Example 28

An E/X/CO -modified liquid plasticizer was prepared from 25 weight % of EVACO-1 and 75 weight % of AAM using Method B.

Examples 29 and 30

The plasticizer blend from Example 20 was blended with the plastisol blend with 40 phr DINP from example 19 using methods similar to those of Example 19 to prepare two E/X/CO-modified plastisols as summarized in Table 4. The plastisols were spread on fabric as described for Example 19 to prepare PVC-coated fabrics.

TABLE 4

| Example | ECO-modified plasticizer weight % | Plastisol weight % | Property of film coating |
|---|---|---|---|
| 29 | 25 | 75 | good |
| 30 | 40 | 60 | sticky |

Examples C1, C2 and 31 to 38

Table 5 summarizes two commercial-type plastisol formulations with typical additive packages. They were blended with E/X/CO-modified plasticizer formulations Blends A through D using methods similar to those of Example 19 as summarized in Table 6.
Blend A: 25 phr of EVACO-1 and 75 phr DINP
Blend B: 5 phr of EVACO-1 and 95 phr DINP
Blend C: 20 phr of EVACO-1 and 80 phr DINP
Blend D: 40 phr of EVACO-1 and 60 phr DINP

TABLE 5

| Component | Description | C1 (PHR) | C2 (PHR) |
|---|---|---|---|
| Iztavil 440 | PVC Resin | 200 | 200 |
| DINP | Plasticizer | 70 | 60 |
| Ferro MX-1719 | Thermal Stabilizer | 4 | 4 |
| Lowilite 22 | UV Absorber | 0.6 | 0.6 |
| Omyacarb 10 SJ | Calcium Carbonate | 25 | 20 |
| White Pigment R-900 | Pigment | 80 | 80 |
| Antimony Trioxide | Flame Retardant | 14 | 14 |
| Antioxidant MX904 | Antioxidant | 0.6 | 0.6 |
| Intercide ABF2 DIDP | Fungicide | 3 | 3 |
| XR-13-443 | Isocyanate adherent | 0 | 0 |
| TOTAL | | 397.2 | 382.2 |
| | % DINP Plasticizer | 17.62% | 15.7% |

The Comparative Example C3 plastisol was prepared from plastisol C1 by adding isocyanate as an adhesion promoter. Example 31 was prepared by mixing the non-plasticizer components of C1 and blending them with Blend B, a 5% solution of EVACO-1 in DINP. Isocyanate was added to the Example 31 composition to obtain Example 32. Examples 33 to 38 were prepared by adding Blends A, B, C or D to plastisol C2. Comparative plastisol C4 was prepared by adding additional DINP to plastisol C2.

The Example plastisols were spread on release paper with skin engraving using a leveler to obtain an uncured coating approximately 1 mm in thickness. The coated paper was placed in an oven set at 180° C. for 1.5 minutes for curing. The release paper was removed to provide cured plasticized PVC sheets. The Example sheets containing EVACO-1 felt less tacky than sheets prepared from the standard plastisols.

The pot life of the Example 31 plastisol with the isocyanate adhesion promoter was 4 to 5 hours, similar to that of the comparative plastisol C3.

TABLE 6

| | Example | | | | | | | | | |
|---|---|---|---|---|---|---|---|---|---|---|
| | C3 | 31 | 32 | 33 | 34 | 35 | 36 | 37 | C4 | 38 |
| Blend A | 0 | | | 20 | 25 | 40 | | | 0 | |
| Blend B | 0 | 70 | 70 | | | | | | 0 | |
| Blend C | 0 | | | | | | | | 0 | 18 |
| Blend D | 0 | | | | | | 40 | 25 | 0 | |
| Iztavil 440 | 200 | 200 | 200 | 41.86 | 39.25 | 31.40 | 31.40 | 39.25 | 41.86 | 200 |
| DINP | 70 | 0 | 0 | 12.56 | 11.77 | 9.42 | 9.42 | 11.77 | 12.56 | 60 |
| Ferro MX-1719 | 4 | 4 | 4 | 0.84 | 0.78 | 0.63 | 0.63 | 0.78 | 0.84 | 4 |
| Lowilite 22 | 0.6 | 0.6 | 0.6 | 0.13 | 0.12 | 0.09 | 0.09 | 0.12 | 0.13 | 0.6 |
| Omyacarb 10 SJ | 25 | 25 | 25 | 4.19 | 3.92 | 3.14 | 3.14 | 3.92 | 4.19 | 20 |
| White Pigment R-900 | 80 | 80 | 80 | 16.75 | 15.70 | 12.56 | 12.56 | 15.70 | 16.75 | 80 |
| Antimony Trioxide | 14 | 14 | 14 | 2.93 | 2.75 | 2.20 | 2.20 | 2.75 | 2.93 | 14 |
| Antioxidant MX904 | 0.6 | 0.6 | 0.6 | 0.13 | 0.12 | 0.09 | 0.09 | 0.12 | 0.13 | 0.6 |
| Intercide ABF2 DIDP | 3 | 3 | 3 | 0.63 | 0.59 | 0.47 | 0.47 | 0.59 | 0.63 | 3 |
| XR-13-443 | 5.92 | 0 | 5.92 | 0.00 | 0.00 | 0.00 | 0.00 | 0.00 | 0.00 | 0.00 |
| Added DINP | 0 | 66.5 | 66.5 | 15 | 18.75 | 30 | 24 | 15 | 20 | 14.4 |
| EVACO-1 | 0 | 3.5 | 3.5 | 5 | 6.25 | 10 | 16 | 10 | 0 | 3.6 |
| Total | 403.12 | 397.2 | 403.12 | 100 | 100 | 100 | 100 | 100 | 100 | 400.2 |
| % Total Plasticizer | 17.36 | 17.62 | 17.36 | 32.56 | 36.77 | 49.42 | 49.42 | 36.77 | 32.56 | 19.49 |
| % EVACO-1 | 0 | 0.88 | 0.86 | 5 | 6.25 | 10 | 16 | 10 | 0 | 0.90 |
| % DINP | 17.36 | 16.74 | 16.5 | 27.56 | 30.52 | 39.42 | 33.42 | 26.77 | 32.56 | 18.59 |

While certain of the preferred embodiments of this invention have been described and specifically exemplified above, it is not intended that the invention be limited to such embodiments. Various modifications may be made without departing from the scope and spirit of the invention, as set forth in the following claims.

The invention claimed is:

1. A free-flowing plasticized halogenated polymer plastisol composition comprising about 15 to about 75 weight % of a combination of plasticizers; about 25 to about 85 weight % of a nonporous halogenated polymer powder having substantially impermeable skin and a porosity less than 0.1 ml/g; and optionally up to about 25 weight % of one or more additives; wherein the combination of plasticizers comprises
   1 to 99 weight % of a high molecular weight solid ethylene-containing copolymer plasticizer having a melt index at 190° C. of less than about 3000 g/10 minutes; wherein said high molecular weight plasticizer is miscible with the halogenated polymer and comprises an ethylene terpolymer of the general formula E/X/CO wherein E represents copolymerized units of ethylene, X represents copolymerized units of a vinyl ester or a (meth)acrylic ester, and CO represents copolymerized units of carbon monoxide; an anhydride-modified ethylene carbon monoxide-functional copolymer; or a combination of the ethylene terpolymer and the anhydride-modified ethylene carbon monoxide-functional polymer; and
   99 to 1 weight % of a low molecular weight liquid plasticizer having a molecular weight less than about 3000 daltons and in which the solid ethylene-containing copolymer plasticizer is soluble;
   wherein the weight percentages of the plasticizers are complementary and based on the total weight of the combination of plasticizers; and wherein the weight percentages of the nonporous halogenated polymer powder, the combination of plasticizers, and the optional additives are complementary and based on the total weight of the free-flowing plasticized halogenated polymer plastisol composition.

2. An article comprising a plasticized halogenated polymer plastisol composition of claim 1.

3. The article of claim 2 wherein the article comprises a substrate coated with the plasticized halogenated polymer plastisol composition, wherein the substrate comprises paper, paperboard, cardboard, pulp-molded shape, textile, material made from a synthetic fiber spun fabric, felt, film, glass fiber, open-cell foam, closed-cell foam, shaped article, or metallic foil.

4. The article of claim 2 wherein the article comprises a glove, a finger cot, artificial leather, shoes, boots, projection screens, clothing, decorative fabrics, protective equipment, billboards, banners, tarpaulins, tents, conveyor belts, building encapsulation sheets, pool liners, roofing membranes or roofing fabrics, waterproofing membranes, geotextiles, wall coverings, flooring, architectural canvas or textiles.

5. The article of claim 2 wherein the article is hollow and is prepared by rotational molding, slush molding, or slush casting.

6. The free-flowing plasticized halogenated polymer plastisol composition of claim 1, wherein the halogenated polymer is selected from the group consisting of vinyl halide polymers; copolymers of vinyl chloride with olefins; and vinylidene halide polymers.

7. The free-flowing plasticized halogenated polymer plastisol composition of claim 1, wherein the halogenated polymer is selected from the group consisting of polyvinyl chloride; copolymers of vinyl chloride with ethylene, polyethylene, vinyl acetate or vinyl ethers; polvinylidene fluoride; and copolymers of vinylidene chloride and vinyl chloride.

8. The free-flowing plasticized halogenated polymer plastisol composition of claim 7, wherein the halogenated polymer is a polyvinyl chloride having a Fikentscher K value from about 50 to about 70, as determined according to German DIN Standard No. 53726.

9. The free-flowing plasticized halogenated polymer plastisol composition of claim 1, wherein the nonporous halogenated polymer powder has a particle size less than 1 µm.

10. The free-flowing plasticized halogenated polymer plastisol composition of claim 1, wherein the ethylene terpolymer of the general formula E/X/CO comprises 40 to 80 weight percent of copolymerized ethylene; about 5 to 60 weight percent of copolymerized (meth)acrylate or vinyl acetate; and about 3 to 35 weight percent of copolymerized carbon monoxide, based on the total weight of the ethylene terpolymer.

11. The free-flowing plasticized halogenated polymer plastisol composition of claim 10, wherein the ethylene terpolymer of the general formula E/X/CO comprises 45 to 80 weight percent of copolymerized ethylene; about 10 to 35 weight % of copolymerized vinyl acetate or (meth)acrylate; and about 3 to 20 weight % of copolymerized carbon monoxide.

12. The free-flowing plasticized halogenated polymer plastisol composition of claim 1, wherein the anhydride-modified ethylene carbon monoxide-functional copolymer is grafted with 0.1 to 5 weight %, based on the total weight of the anhydride-modified of a monomer selected from the group consisting of ethylenically unsaturated carboxylic acids and ethylenically unsaturated carboxylic acid anhydrides, derivatives of such acids, and ethylenically unsaturated hydrocarbons with other functional groups.

13. The free-flowing plasticized halogenated polymer plastisol composition of claim 12, wherein the ethylenically unsaturated carboxylic acids are selected from the group consisting of acrylic acid, methacrylic acid, maleic acid, fumaric acid, itaconic acid, crotonic acid, itaconic anhydride; the ethylenically unsaturated carboxylic acid anhydrides are selected from the group consisting of maleic anhydride and substituted maleic anhydride; the derivatives of the unsaturated acids are selected from the group consisting of salts, amides, imides and esters; and the unsaturated hydrocarbons with other functional groups are selected from the group consisting of vinyl pyridines, vinyl silanes and unsaturated alcohols.

14. The free-flowing plasticized halogenated polymer plastisol composition of claim 1, wherein the low molecular weight liquid plasticizers are selected from the group consisting of phthalates, adipates, azealates, trimellitates, benzoates, phosphate esters, and polyesters.

15. The free-flowing plasticized halogenated polymer plastisol composition of claim 14, wherein the low molecular weight liquid plasticizers are selected from the group consisting of dioctyl phthalate, diundecyl phthalate, dibutyl adipate, dibenzylazelate, trioctyltrimellitate, diphenyl octylphosphate; low molecular weight polyesters; polypropylene glycol; phthalate esters; phthalate diesters; acetic acid esters of monoglycerides made from castor oil; tris(2-ethylhexyl) trimellitate; bis(2-ethylhexyl) adipate; 1,5-pentanediol dibenzoate; adipic acid polyesters; polyetheresters; and epoxy esters or maleates.

16. The free-flowing plasticized halogenated polymer plastisol composition of claim 1, wherein the weight ratio of high molecular weight solid plasticizer to low molecular weight liquid plasticizer is from 1:20 to 1:1.

17. The free-flowing plasticized halogenated polymer plastisol composition of claim 16, wherein the weight ratio of high molecular weight solid plasticizer to low molecular weight liquid plasticizer is from 1:5 to 1:1.5.

18. The free-flowing plasticized halogenated polymer plastisol composition of claim 1, wherein the one or more additives are selected from the group consisting of antioxidants, dyes, pigments, other coloring agents, ultraviolet (UV) absorbers, UV stabilizers, thermal stabilizers, nucleating agents, anti-static agents, fire-retardants, smoke suppressors, fusion aids, process aids, glass, mineral fillers, lubricants, epoxidized soy oil, fungicides, and adhesion promoters.

19. The free-flowing plasticized halogenated polymer plastisol composition of claim 18, wherein the thermal stabilizer is selected from the group consisting of inorganic and organometallic compounds, nitrogenous and epoxy compounds, and polyacrylamide; or wherein the antioxidant is selected from the group consisting of phenolic types, thioethers and phosphites; or wherein the UV stabilizer comprises a benzotriazole-type UV absorber.

* * * * *